United States Patent
Naegele et al.

(10) Patent No.: US 9,434,379 B2
(45) Date of Patent: Sep. 6, 2016

(54) SEMICONDUCTOR CIRCUIT AND METHOD IN A SAFETY CONCEPT FOR USE IN A MOTOR VEHICLE

(75) Inventors: Volker Naegele, Schoenwald (DE); Michael Pechtold, Fuerth (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 350 days.

(21) Appl. No.: 14/000,071

(22) PCT Filed: Feb. 16, 2012

(86) PCT No.: PCT/DE2012/100037
§ 371 (c)(1),
(2), (4) Date: Sep. 20, 2013

(87) PCT Pub. No.: WO2012/113385
PCT Pub. Date: Aug. 30, 2012

(65) Prior Publication Data
US 2014/0052325 A1    Feb. 20, 2014

(30) Foreign Application Priority Data
Feb. 18, 2011 (DE) .................. 10 2011 011 755

(51) Int. Cl.
*B60W 30/00* (2006.01)
*G06F 11/07* (2006.01)
(Continued)

(52) U.S. Cl.
CPC .............. *B60W 30/00* (2013.01); *B60K 26/04* (2013.01); *G06F 11/076* (2013.01); *G06F 11/0739* (2013.01); *G06F 11/0757* (2013.01); *G06F 11/0793* (2013.01); *G06F 11/2028* (2013.01); *B60K 2026/046* (2013.01); *G06F 11/0796* (2013.01); *G06F 11/2041* (2013.01)

(58) Field of Classification Search
CPC . B60W 30/00; G06F 11/2028; G06F 11/076; G06F 11/0739; G06F 11/0793; G06F 11/0757; G06F 11/2041; G06F 11/0796; B60K 26/04; B60K 2026/046
See application file for complete search history.

(56) References Cited

U.S. PATENT DOCUMENTS 5,367,665 A    11/1994  Koch et al.
5,880,568 A    3/1999   Bederna et al.
(Continued)

FOREIGN PATENT DOCUMENTS

DE    35 39 407    5/1987
DE    41 12 334    10/1992
(Continued)

OTHER PUBLICATIONS

International Search Report of the International Searching Authority for International Application PCT/DE2012/100037, mailed Jul. 30, 2013, 3 pages, European Patent Office, HV Rijswijk, Netherlands.
(Continued)

*Primary Examiner* — Mussa A Shaawat
*Assistant Examiner* — Kelly D Williams
(74) *Attorney, Agent, or Firm* — W. F. Fasse (57) ABSTRACT

A semiconductor circuit for an electronic control device for a system in a motor vehicle, wherein the system is not mechanically intrinsically safe, includes a functional computer (FR), at least one monitoring unit (MU) and a monitoring computer that are each physically independent of each other. A full or a restricted function of the semiconductor circuit is ensured by the functional computer (FR) in the event of a failure of the monitoring computer (UR) and vice versa. The semiconductor circuit is monitored according to a monitoring method.

17 Claims, 4 Drawing Sheets

(51) Int. Cl.
 *B60K 26/04* (2006.01)
 *G06F 11/20* (2006.01)

(56) References Cited

U.S. PATENT DOCUMENTS

| | | | |
|---|---|---|---|
| 7,801,963 | B2 | 9/2010 | von Schwertfuehrer |
| 2005/0033558 | A1 | 2/2005 | Schwertfuehrer |
| 2005/0044214 | A1* | 2/2005 | Schwertfuehrer ...... H04L 29/06 709/224 |
| 2009/0164059 | A1* | 6/2009 | Takeda ................... G07C 5/085 701/31.4 |
| 2010/0162042 | A1 | 6/2010 | Inoue et al. |
| 2012/0272104 | A1 | 10/2012 | Jacobi et al. |

FOREIGN PATENT DOCUMENTS

| | | |
|---|---|---|
| DE | 44 38 714 | 5/1996 |
| DE | 103 31 873 | 2/2006 |
| GB | 2 104 247 | 3/1983 |
| JP | 05-274166 A | 10/1993 |
| JP | 2000-104567 A | 4/2000 |
| JP | 2002-351700 A | 12/2002 |
| WO | WO 2011/072662 | 6/2011 |

OTHER PUBLICATIONS

PCT International Preliminary Report on Patentability including English Translation of PCT Written Opinion of the International Searching Authority for International Application PCT/DE2012/100037, issued Nov. 5, 2013, 9 pages, International Bureau of WIPO, Geneva, Switzerland.

German Search Report for German Application No. 10 2011 011 755.5, dated Mar. 12, 2012, 5 pages, Muenchen, Germany, with English translation, 5 pages.

Martin Hobelsberger et al., "Modellbasierte Sicherheitsanalysen von Software-Architekturen", ("Model-Based Safety Analyses of Software-Architectures"), in Proceedings of the 1$^{st}$ Embedded Software Engineering Congress, ISBN 978-3-8343-2401-6, Dec. 2008, pp. 436 to 443.

* cited by examiner

SEMICONDUCTOR CIRCUIT AND METHOD IN A SAFETY CONCEPT FOR USE IN A MOTOR VEHICLE

FIELD OF THE INVENTION

The invention relates to a semiconductor circuit and a method in a safety concept for use in a motor vehicle according to the preambles of the independent claims.

BACKGROUND INFORMATION

There are various concepts for designing a functional unit—e.g., a control device with a semiconductor circuit—for use in a motor vehicle in such a manner that the control device is free of single defects or intrinsically safe. Monitoring in the three-layer concept is one possibility of achieving an intrinsically safe control device.

A method and a device for controlling a drive unit of a vehicle are known from DE 44 38 714 A1, wherein the control device for power control has a single microcontroller only. The microcontroller performs both control and monitoring, wherein operational reliability and service quality are guaranteed by at least two layers for control and monitoring being provided in a single microcontroller, said layers being independent of each other, wherein the functions for power control are determined in a first layer and said functions, and thus the operability of the microcontroller itself, are monitored in a second layer, particularly in cooperation with a monitoring module.

Furthermore, DE 44 38 714 A1 describes a third layer, which performs a program flow check of the second layer. This monitoring by the third layer considerably enhances the reliability and service quality of the control device. In particular, the program flow check of the second layer is performed in the monitoring module in the form of dialog communication.

The three-layer monitoring concept (E-Gas concept) is usually used in engine control devices of vehicles to monitor electronic engine control systems, wherein the engine control device essentially consists of the so-called functional computer and the monitoring computer. The functional computer and the monitoring computer communicate with each other by means of a dialog procedure and have separate switch-off paths.

Layer 1 comprises the actual functional module for the functional control of the drive unit of the vehicle and is therefore also referred to as functional layer. It includes engine control functions, inter alia for the conversion of the requested engine torques, component monitoring, the diagnosis of the input and output quantities, and the control of the system reactions when an error has been detected. Layer 1 is executed on the functional computer.

Layer 2 is also referred to as function monitoring layer. It comprises the safety module and is also executed on the functional computer. It detects the defective execution of a monitoring-relevant extent of the functional module of Layer 1, inter alia by monitoring the calculated torques or the vehicle acceleration. In the event of an error, system reactions will be triggered. Layer 2 is executed in a functional-computer hardware area that is secured by Layer 3.

Layer 3 is also referred to as computer monitoring layer. It comprises the monitoring module on an independent monitoring unit (ASIC or µC) with instruction set test, program flow check, ADC test as well as cyclic and complete memory tests of Layer 2. The monitoring unit, which is independent of the functional computer, tests the proper processing of the program instructions of the functional computer, said test being a dialog procedure. In the event of an error, system reactions will be triggered independently of the functional computer.

In present-day electronic engine control systems, the entire functional and monitoring software is integrated in a control device. The monitoring concept may also be realized in other vehicle control devices, in particular in transmission control devices.

In this safety concept, the actuators will be usually put in a currentless state by means of the power-determining output stages of the control device in the event of an error of the second layer. In the event of an error in the third layer, the actuators will be put in a currentless state by means of the power-determining output stages of the control device in a first step, whereafter the functional computer is reset by the monitoring unit (third layer) in a second step. This currentless state is usually the safe state of the complete, controlled system, particularly of the automatic transmission.

This specifically means for a transmission with a clutch that is open due to a mechanical elastic force in the pressureless state that in case of emergency, when the power-determining output stages are disabled and the hydraulic system for actuating the clutch cannot be used any more, the intended emergency state is nevertheless reached because the clutch is permanently kept open by the mechanical elastic force and thus no torque can be transmitted from the engine to the driving wheels.

However, there are transmission types where the clutch is closed against a mechanical elastic force in the currentless or pressureless state (referred to as normally closed clutches). The monitoring concept discussed herein cannot be applied to them in the manner described above.

The third layer may be an ASIC or a separate microcontroller that primarily serves to monitor the functional computer. The data exchange for the dialog procedure is usually performed via a customary computer interface, e.g., SPI (Serial Peripheral Interface).

If the third layer is realized on an ASIC functioning as a monitoring unit, the actuators can only be put in one state in the event of an error occurring in the dialog procedure, i.e., the power-determining output stages will usually be switched to a currentless state. It is impossible to accomplish any switching sequences or controlled actuation sequences, wherein an actuation sequence may consist in determining the position of an actuator by means of an appropriate sensor signal and changing or controlling it when required. That is because the ASIC can only output a switching signal, which influences the electronic system accordingly. Moreover, the ASIC cannot process a sensor signal and thus cannot output a control signal, either.

If the third layer is realized on an additional computer (µC), it will be impossible—in the event of an error occurring in the dialog procedure—to ascertain beyond all doubt which of the two computers (the "interrogator" or the "responder") really operates defectively. Therefore, in the event of an error, both computers will have to establish the safe system state (currentless output stages) and be reset, which means that it will be impossible to accomplish—even if a second computer is used in the third layer—any switching sequences or controlled actuation sequences any more in the event of an error.

In both cases, an additional disadvantage consists in the fact that the only state in which the vehicle can be immediately put is a state in which it cannot be driven (engine switched off, drive train open=breakdown) and it is impossible to operate in an emergency running mode (engine switched on, restricted transmission of torque=limp home mode) because no control functions are available.

SUMMARY OF THE INVENTION

In view of the above, it is an object of at least one embodiment of the invention to create a semiconductor circuit for an electronic control device for use in a system in a motor vehicle that will ensure, in the event of an error, a controlled safe emergency running mode or at least a safe state, particularly the state "drive train open", said system not being mechanically intrinsically safe.

The above object can be achieved by a semiconductor circuit with the features according to at least one embodiment of the invention as set forth herein.

According to ISO 26262, the functional computer, the monitoring unit and the monitoring computer are arranged on the semiconductor circuit as independent components that are separate from each other. Preferably, they are arranged on a common circuit carrier. If the monitoring computer fails on account of a safety-relevant error, the functional computer will be able to take over the full or a restricted function of the semiconductor circuit. Conversely, the monitoring computer will be able to take over the full or a restricted function of the semiconductor circuit if the functional computer fails, wherein the restricted state may be that the drive train is open or that an emergency running mode with a restricted transmission of torque can be ensured.

This means that in principle one computer or both computers can take over said function, whereby full or partial redundancy is established. In the event of an error, one computer will be regarded as being capable of operating, whereas the other one will be kept in the reset state because it was reliably detected to be inoperable.

This ensures that at any instant of operation, the states of the drive train are reliably detected by at least one of the two computers and this information is processed in the hardware-software system in order to ensure the safe state (drive train open or emergency running mode) at any time.

A further advantage of this concept consists in the fact that particular application-dependent functionalities can be transferred from the functional computer to the monitoring computer.

It is also possible to shift functional blocks between the functional computer and the monitoring computer if there are any problems with resources in the semiconductor circuit in order not to exceed the maximum CPU load.

It is also possible to have the application-dependent functionalities available in the functional computer as well as in the monitoring computer in order to achieve full redundancy.

A further safety aspect consists in the particular fact that the functional computer and the monitoring computer (UR) each have a separate power supply.

Particularly during the run-up phase of the two computers, suitable timing and logic ensure that a safety-relevant error in the system results in triggering a respective safety function. A watchdog integrated in the power supply of the monitoring computer can additionally monitor the monitoring computer in those phases in which the monitoring computer is not or not yet monitored by the functional computer.

A further object of at least one embodiment of the invention consists in creating a method for an electronic control device for use in a system in a motor vehicle that will ensure, in the event of an error, a controlled safe emergency running mode or at least a safe state, particularly the state "drive train open", said system not being mechanically intrinsically safe.

This object can be achieved by a method according to at least one embodiment of the invention with features as set forth herein.

With regard to a method for monitoring the semiconductor circuit in the electronic control device, there are a semiconductor circuit with a single monitoring unit on the one hand and a semiconductor circuit with more than one monitoring unit on the other hand, wherein in the latter case, the individual monitoring units may be arranged on a single electronic component or on several components that are separate from each other.

In such a method, a first step consists in initializing the individual dialog procedures among the computers on the one hand and between the computers and the corresponding monitoring units on the other hand.

Depending on where in the dialog procedure an error occurs, the monitoring computer is reset and the functional computer takes over, in the emergency mode, the function of the semiconductor circuit or vice versa. Such functions are usually those functions which serve to establish the safe state or to perform an emergency running mode (limp home). The defective computer is kept in the reset state until, e.g., the end of a power-up reset of the semiconductor circuit. The use of more than one monitoring unit increases costs on the one hand but enhances the safety of the system on the other hand.

Particularly during the run-up phase of the functional computer and the monitoring computer, suitable timing (e.g., time-outs) and logic or software ensure that an error occurring in this phase results in triggering the respective safety function. A watchdog integrated in the power supply of the monitoring computer can additionally monitor the monitoring computer in those phases in which it is not or not yet monitored by the functional computer.

Advantageously, a controlled shut-down of the semiconductor circuit is accomplished by passing through, in the shut-down phase of the two computers, a controlled deactivation sequence of the monitoring of the semiconductor circuit until the respective power supply of the two computers is switched off. For example, all active dialog procedures are continued until the functional computer is on the point of disabling the self-holding functions of all power supplies.

By using a suitable system architecture consisting of hardware and software, this concept ensures that at any instant of operation, particularly in the initialization phase of the semiconductor circuit, the safety-relevant states of the drive train are reliably detected by at least one of the two computers and this information is processed in the hardware-software system in order to ensure, in the event of an error, a safe state of the vehicle (drive train open or emergency running mode) at any time.

BRIEF DESCRIPTION OF THE DRAWINGS

In the following description, the features and details of the invention will be explained in greater detail on the basis of exemplary embodiments in connection with the attached drawings, wherein the features and contexts described in individual variants are applicable in principle to all exemplary embodiments.

In the drawings.

DETAILED DESCRIPTION OF EXAMPLE EMBODIMENTS OF THE INVENTION

Figure 1:
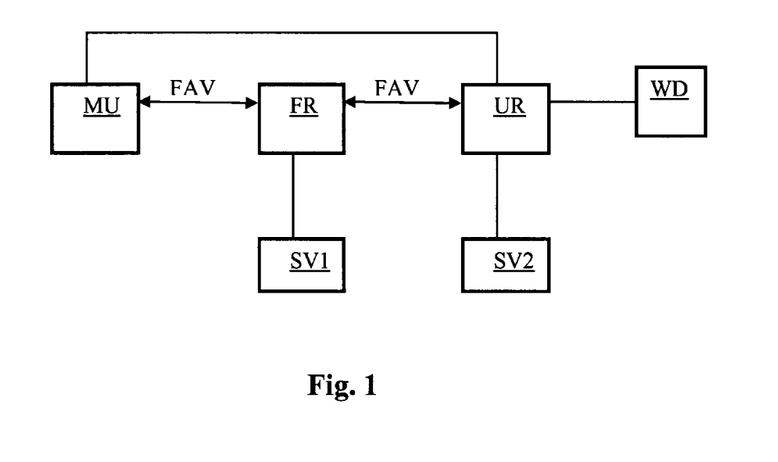
FIG. 1 shows a block diagram of the semiconductor circuit with one monitoring unit.

FIG. 1 shows a block diagram of the semiconductor circuit with a functional computer (FR), a monitoring computer (UR), and a monitoring unit (MU). They are each physically independent of each other. In particular, the functional computer (FR) controls the normal operation of the motor vehicle by executing at least the Layer 1 and Layer 2 functionalities of the above-described E-Gas concept. The monitoring unit (MU) can execute at least the Layer 3 functionality of the E-Gas concept. Furthermore, the monitoring unit (MU) communicates with the monitoring computer (UR) by means of signals. A dialog procedure (FAV) is performed between the functional computer (FR) and the monitoring computer (UR) as well as between the functional computer (FR) and the monitoring unit (MU), said dialog procedures serving to monitor the correct functioning of FR, UR, and MU. In FIG. 1, said dialog procedures are represented by the double-headed arrow between the functional computer (FR) and the monitoring computer (UR) and by the double-headed arrow between the functional computer (FR) and the monitoring unit (MU).

Particularly in the event of a failure of the monitoring computer (UR), the full or a restricted function of the semiconductor circuit is ensured by the operational functional computer (FR). If the functional computer (FR) fails, the full or a restricted function of the semiconductor circuit can be advantageously ensured by the operational monitoring computer (UR).

A further advantage with respect to safety consists in the fact that the functional computer and the monitoring computer (UR) each have a separate power supply.

An additional watchdog (WD) integrated particularly in the power supply (SV2) of the monitoring computer (UR) can monitor the monitoring computer (UR) during the run-up phase of the two computers (FR, UR) when the monitoring computer (UR) is not or not yet monitored by the functional computer (FR). Particularly during this phase, suitable timing and logic ensure that a safety-relevant error in the system results in triggering a respective safety function.

Figure 2:
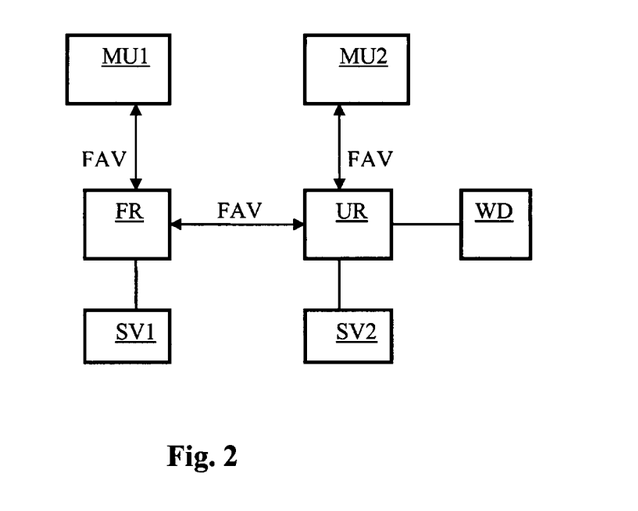
FIG. 2 shows a block diagram of the semiconductor circuit with two monitoring units.

FIG. 2 shows a block diagram of the semiconductor circuit of FIG. 1. However, there are two monitoring units (MU1, MU2), wherein particularly the first monitoring unit (MU1) monitors the correct functioning of the functional computer (FR) by means of a dialog procedure (FAV). Correspondingly, the second monitoring unit (MU2) monitors the correct functioning of the monitoring computer (UR). The functional computer (FR) and the monitoring computer (UR) also communicate with each other by means of signals, e.g., in order to perform a dialog procedure (FAV).

Figure 3:
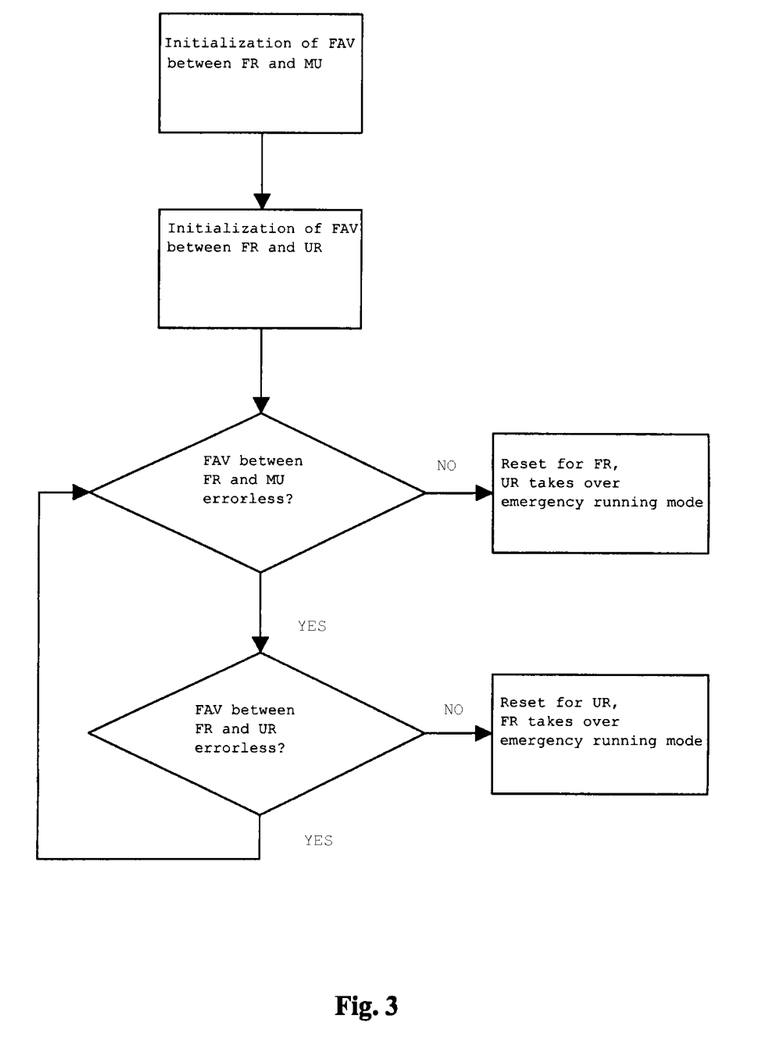
FIG. 3 shows a flow chart for a method with one monitoring unit.

FIG. 3 shows a flow chart for a method for monitoring a semiconductor circuit with one monitoring unit (MU), which monitors the correct functioning of the functional computer (FR) and also communicates with the monitoring computer (UR) by means of signals.

First, the corresponding dialog procedures (FAV) between the functional computer (FR) and the monitoring unit (MU) and between the functional computer (FR) and the monitoring computer (UR) are initialized, wherein the two dialog procedures (FAV) do not have to be identical.

If no error occurs in the dialog procedure (FAV) between the functional computer (FR) and the monitoring unit (MU) but an error occurs in the dialog procedure (FAV) between the functional computer (FR) and the monitoring computer (UR), the monitoring computer will be put out of operation according to a predetermined error-dependent sequence and kept in the reset state by the functional computer. In this case, the functional computer (FR) will take over the full or a restricted function of the semiconductor circuit. The monitoring computer (UR) will be kept in the reset state until, e.g., the end of a power-up reset of the semiconductor circuit.

If an error occurs in the dialog procedure (FAV) between the functional computer (FR) and the monitoring unit (MU), the functional computer will be put out of operation according to a predetermined error-dependent sequence and kept in the reset state by the monitoring computer. In this case, the monitoring computer (UR) will take over the full or a restricted function of the semiconductor circuit. The functional computer (FR) will be kept in the reset state until, e.g., the end of a power-up reset of the semiconductor circuit.

Figure 4:
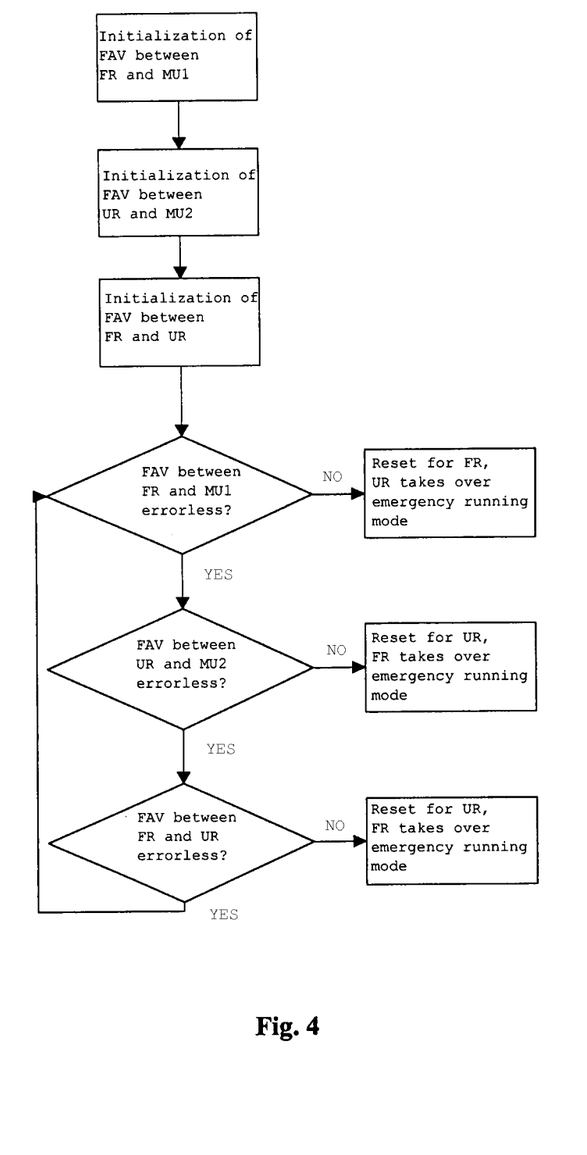
FIG. 4 shows a flow chart for a method with two monitoring units.

FIG. 4 shows a flow chart for a method for monitoring a semiconductor circuit with two monitoring units (MU1, MU2), wherein the first monitoring unit (MU1) monitors the functional computer (FR) and the second monitoring unit (MU2) monitors the monitoring computer (UR). First, the corresponding dialog procedures (FAV) between the functional computer (FR) and the first monitoring unit (MU1), between the monitoring computer (UR) and the second monitoring unit (MU2) and between the functional computer (FR) and the monitoring computer (UR) are initialized, wherein the respective dialog procedures (FAV) may be different.

If an error occurs in the dialog procedure (FAV) between the functional computer (FR) and the first monitoring unit (MU1), particularly the first monitoring unit (MU1) will reset the functional computer (FR) according to a predetermined error-dependent sequence. The reset signal of the functional computer (FR) will be read in by the monitoring computer (UR), and the monitoring computer (UR) will take over the full or a restricted function of the semiconductor circuit.

If an error occurs in the dialog procedure (FAV) between the monitoring computer (UR) and the second monitoring unit (MU2), particularly the second monitoring unit (MU2) will reset the monitoring computer (UR) according to a predetermined error-dependent sequence. This reset signal will be read in by the functional computer (FR), and the functional computer (FR) will take over the full or a restricted function of the semiconductor circuit.

If an error occurs in the dialog procedure (FAV) between the functional computer (FR) and the monitoring computer (UR), particularly the functional computer (FR) will reset the monitoring computer (UR) according to a predetermined error-dependent sequence. The functional computer (FR) will then advantageously take over the full or a restricted function of the semiconductor circuit. It is also conceivable that the monitoring computer (UR) will reset the functional computer (FR) and then take over the full or a restricted function of the semiconductor circuit.

The following explanations relate to methods for monitoring a semiconductor circuit with one as well as with two monitoring units (MU1, MU2).

Figure 5:
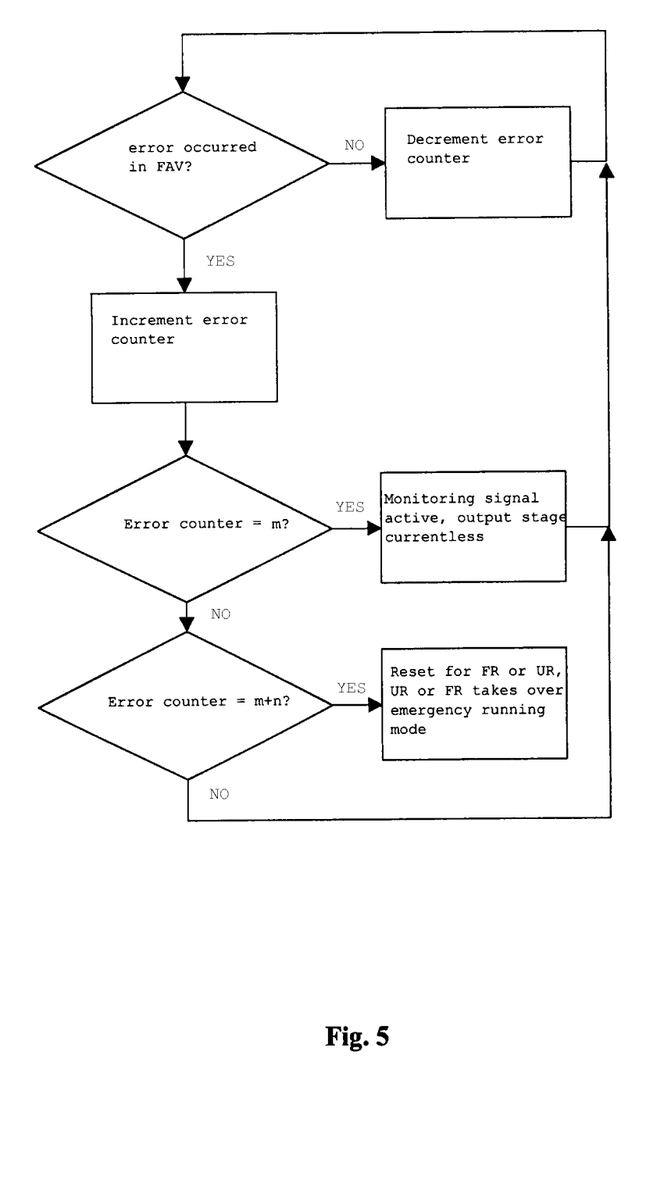
FIG. 5 shows a flow chart for a sequence according to which a computer is reset.

FIG. 5 describes an example of a predetermined error-dependent sequence according to which a computer (FR, UR) is reset. In particular, the sequence may be such that the monitoring/interrogating unit (MU, FR, UR) first activates a monitoring signal after m wrong responses. Said monitoring signal switches the critical actuator output stages to a currentless state. After further n wrong responses occurring in the dialog procedure (FAV) between the monitoring/interrogating unit (MU, FR, UR) and the monitored/responding unit (FR, UR), the monitoring/interrogating unit (MU, FR, UR) resets the monitored/responding unit (FR, UR). Advantageously, the values for m and n are between 4 and 10.

The unit (FR, UR) that is still capable of operating can read in the state of the monitoring signal and of the reset signal and utilize it in such a manner that this unit (FR, UR) that is capable of operating keeps the inoperable unit (FR, UR) in the reset state and takes appropriate necessary measures (e.g., taking over the full or a restricted function of the semiconductor circuit, which may also consist in, e.g., establishing the safe system state).

The respective defective computer (FR, UR) is kept in the reset state until, e.g., the end of a power-up reset of the semiconductor circuit. The use of more than one monitoring unit enhances the safety of the system.

A suitable initialization sequence and a mandatorily independent power supply for each computer (FR, UR) ensure that the computers (FR, UR) do not obstruct each other or that no temporal gap occurs in the monitoring process or that a simple error in power supply does not make the entire system inoperable.

Particularly during the run-up phase of the functional computer (FR) and the monitoring computer (UR), suitable timing (e.g., time-outs) and logic or software ensure that an error occurring in this phase results in triggering the respective safety function. A watchdog (WD) integrated in the power supply (SV1, SV2) can additionally monitor the computers (FR, UR) in those phases in which they are not or not yet monitored by the monitoring units (MU1, MU2).

Advantageously, a controlled shut-down of the semiconductor circuit is accomplished by passing through, in the shut-down phase of the two computers (FR, UR), a controlled deactivation sequence of the monitoring of the semiconductor circuit until the respective power supply (SV1, SV2) of the two computers (FR, UR) is switched off. For example, all dialog procedures (FAV) that are active at that time are continued until the functional computer (FR) is on the point of disabling the self-holding functions of all power supplies (SV1, SV2).

Therefore, with a system to be controlled that is not mechanically intrinsically safe, particularly a double clutch transmission with at least one normally closed clutch where a switching sequence or a controlled sequence or active intervention is necessary for establishing the emergency running state or safe state, and if said sequence or said control is supposed to be performed by a computer, it must be ensured that said computer is fully capable of operating. Such a sequence or intervention may consist in, e.g., a controlled energization of a clutch valve or an electro-hydraulic design of a gear.

This means that in principle one computer or both computers can take over said function (full or partial redundancy) and that in the event of an error, it will be necessary for this computer to be still regarded as being capable of operating, whereas the other one will be kept in the reset state because it was/is reliably detected to be inoperable.

By using a suitable system architecture consisting of hardware and software, this concept ensures that at any instant of operation, particularly in the initialization phase of the semiconductor circuit, the safety-relevant states of the drive train are reliably detected by at least one of the two computers and this information is processed in the hardware-software system in order to ensure a safe state of the vehicle (drive train open or emergency running mode) at any time.

A further advantage of this concept consists in the fact that particular application-dependent functionalities can be transferred from the functional computer to the monitoring computer, especially those functionalities which must be performed by the monitoring computer in the event of an error.

It is also possible to shift, if there are any problems with resources, functional blocks between the functional computer and the monitoring computer in order not to exceed the maximum CPU load.

It is also possible to have the application-dependent functionalities available in the functional computer as well as in the monitoring computer in order to achieve full redundancy.

The present invention has been described on the basis of the above description in such a manner that the principle of the invention and the practical application thereof is explained in the best way possible. However, the invention may be naturally realized in numerous other embodiments and combinations if modified suitably.

The invention claimed is:

1. A semiconductor circuit for an electronic control device for a system in a motor vehicle, said system not being mechanically intrinsically safe, comprising
   a functional computer (FR) configured for controlling a normal operation of the motor vehicle by executing at least functionalities of a functional layer and of a function monitoring layer of a three-layer monitoring concept,
   at least one monitoring unit (MU) configured for executing at least a functionality of a computer monitoring layer of the three-layer monitoring concept,
   a monitoring computer (UR) on which at least one dialog procedure (FAV) with the functional computer (FR) can be performed,
   a first power supply that is connected to and configured to supply power to the functional computer, and
   a second power supply that is separate from the first power supply, and that is connected to and configured to supply power to the monitoring computer,
   wherein:
   the functional computer (FR), the monitoring unit (MU) and the monitoring computer (UR) are each physically independent of each other,
   a full function or a restricted function of the semiconductor circuit is ensured by the functional computer (FR) if the monitoring computer (UR) fails, and
   the full function or the restricted function of the semiconductor circuit is ensured by the monitoring computer (UR) if the functional computer (FR) fails.

2. The semiconductor circuit according to claim 1, characterized in that the second power supply (SV2) has a watchdog (WD) configured for additionally monitoring the monitoring computer (UR).

3. The semiconductor circuit according to claim 1, characterized in that the power supplies (SV1, SV2) each have a watchdog (WD) configured for monitoring the computers (FR, UR).

4. A method of monitoring a semiconductor circuit for an electronic control device for a system of a motor vehicle,
wherein the semiconductor circuit includes a functional computer configured to control a normal operation of the system of the motor vehicle by executing a functional layer functionality and a function monitoring layer functionality of a three-layer monitoring concept, a monitoring computer that is physically independent of the functional computer, and only a single monitoring unit that is physically independent of the functional computer and the monitoring computer and that is configured to execute a computer monitoring layer functionality of the three-layer monitoring concept, and
wherein the method comprises the following steps:
a. initializing a first dialog procedure (FAV) between the monitoring unit (MU) and the functional computer (FR),
b. initializing a second dialog procedure (FAV) between the functional computer (FR) and the monitoring computer (UR),
c. if no error occurs in the first dialog procedure but an error occurs in the second dialog procedure, then the functional computer (FR) resets the monitoring computer (UR) according to a predetermined error-dependent sequence and takes over a full function or a restricted function of the semiconductor circuit,
d. if an error occurs in the first dialog procedure, then the monitoring unit (MU) first activates a monitoring signal according to a predetermined error-dependent sequence and then resets the functional computer (FR),
e. reading in the monitoring signal and a reset signal of the functional computer (FR) by the monitoring computer (UR), and
f. taking over the full function or the restricted function of the semiconductor circuit by the monitoring computer (UR).

5. A method of monitoring a semiconductor circuit for an electronic control device for a system of a motor vehicle,
wherein the semiconductor circuit includes a functional computer configured to control a normal operation of the system of the motor vehicle by executing a functional layer functionality and a function monitoring layer functionality of a three-layer monitoring concept, a monitoring computer that is physically independent of the functional computer, and first and second monitoring units that are physically independent of the functional computer and the monitoring computer and that are configured to execute a computer monitoring layer functionality of the three-layer monitoring concept, and
wherein the method comprises the following steps:
a. initializing a first dialog procedure (FAV) between the first monitoring unit (MU1) and the functional computer (FR),
b. initializing a second dialog procedure (FAV) between the second monitoring unit (MU2) and the monitoring computer (UR),
c. initializing a third dialog procedure (FAV) between the functional computer (FR) and the monitoring computer (UR),
d. if an error occurs in the first dialog procedure, then the first monitoring unit (MU1) first activates a monitoring signal according to a predetermined error-dependent sequence and then resets the functional computer (FR),
e. reading in the monitoring signal and a reset signal of the functional computer (FR) by the monitoring computer (UR),
f. taking over a full function or a restricted function of the semiconductor circuit by the monitoring computer (UR),
g. if an error occurs in the second dialog procedure, then the second monitoring unit (MU2) first activates a monitoring signal according to a predetermined error-dependent sequence and then resets the monitoring computer (UR),
h. reading in the monitoring signal and a reset signal of the monitoring computer (UR) by the functional computer (FR),
i. taking over the full function or the restricted function of the semiconductor circuit by the functional computer (FR),
j. if an error occurs in the third dialog procedure, then the functional computer (FR) resets the monitoring computer (UR) according to a predetermined error-dependent sequence, and
k. taking over the full function or the restricted function of the semiconductor circuit by the functional computer (FR).

6. The method according to claim 5, characterized in that the predetermined error-dependent sequence according to which the monitoring signal is first activated and the functional computer or the monitoring computer (FR, UR) is then reset comprises the following steps:
a. the interrogating unit (MU, FR, UR), being the monitoring unit, the functional computer or the monitoring computer that initiated the respective dialog procedure, first activates the monitoring signal after m wrong responses, said monitoring signal switching critical actuator output stages to a currentless state,
b. after further n wrong responses occurring in the respective dialog procedure (FAV) between the interrogating unit (MU, FR, UR) and the responding unit (FR, UR), being the functional computer or the monitoring computer that responds to the respective dialog procedure, the interrogating unit (MU, FR, UR) resets the responding unit (FR, UR).

7. The method according to claim 5, characterized in that during a run-up phase of the computers (FR, UR), suitable timing and logic or software ensure that a respective safety function is triggered in the event of an error.

8. The method according to claim 5, characterized in that a controlled shut-down of the semiconductor circuit is accomplished by passing through, in a shut-down phase of the computers (FR, UR), a controlled deactivation sequence of monitoring until a power supply (SV1, SV2) of the semiconductor circuit is switched off.

9. The method according to claim 8, characterized in that all active ones of the dialog procedures are continued until the functional computer (FR) is at a point of disabling self-holding functions of all power supplies (SV1, SV2) of the semiconductor circuit.

10. The method according to claim 5, characterized in that a watchdog (WD) integrated in a power supply (SV2) of the monitoring computer (UR) monitors the monitoring computer (UR) in operational phases in which the monitoring computer is not yet monitored by the functional computer.

11. The method according to claim 5, characterized in that a watchdog (WD) integrated in power supplies (SV1, SV2) of the computers (FR, UR) additionally monitors the computers (FR, UR) in operational phases in which the computers are not or not yet monitored by the monitoring units (MU1, MU2).

12. The method according to claim 4, characterized in that the predetermined error-dependent sequence according to which the monitoring signal is first activated and the functional computer or the monitoring computer (FR, UR) is then reset comprises the following steps:
    a. the interrogating unit (MU, FR, UR), being the monitoring unit, the functional computer or the monitoring computer that initiated the respective dialog procedure, first activates the monitoring signal after m wrong responses, said monitoring signal switching critical actuator output stages to a currentless state,
    b. after further n wrong responses occurring in the respective dialog procedure (FAV) between the interrogating unit (MU, FR, UR) and the responding unit (FR, UR), being the functional computer or the monitoring computer that responds to the respective dialog procedure, the interrogating unit (MU, FR, UR) resets the responding unit (FR, UR).

13. The method according to claim 4, characterized in that during a run-up phase of the computers (FR, UR), suitable timing and logic or software ensure that a respective safety function is triggered in the event of an error.

14. The method according to claim 4, characterized in that a controlled shut-down of the semiconductor circuit is accomplished by passing through, in a shut-down phase of the computers (FR, UR), a controlled deactivation sequence of monitoring until a power supply (SV1, SV2) of the semiconductor circuit is switched off.

15. The method according to claim 14, characterized in that all active ones of the dialog procedures are continued until the functional computer (FR) is at a point of disabling self-holding functions of all power supplies (SV1, SV2) of the semiconductor circuit.

16. The method according to claim 4, characterized in that a watchdog (WD) integrated in a power supply (SV2) of the monitoring computer (UR) monitors the monitoring computer (UR) in operational phases in which the monitoring computer is not yet monitored by the functional computer.

17. The method according to claim 4, characterized in that a watchdog (WD) integrated in power supplies (SV1, SV2) of the computers (FR, UR) additionally monitors the computers (FR, UR) in operational phases in which the computers are not or not yet monitored by the monitoring unit (MU1, MU2).

* * * * *